United States Patent
Jung et al.

(10) Patent No.: US 10,333,594 B2
(45) Date of Patent: Jun. 25, 2019

(54) METHOD OF TRANSMITTING DISCOVERY SIGNAL AND RADIO LINK SETUP METHOD USING THE SAME

(71) Applicant: ELECTRONICS AND TELECOMMUNICATIONS RESEARCH INSTITUTE, Daejeon (KR)

(72) Inventors: Soo Jung Jung, Daejeon (KR); Seung Kwon Baek, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 2 days.

(21) Appl. No.: 15/800,799

(22) Filed: Nov. 1, 2017

(65) Prior Publication Data
US 2018/0123660 A1    May 3, 2018

(30) Foreign Application Priority Data
Nov. 1, 2016  (KR) .................. 10-2016-0144785
Oct. 31, 2017  (KR) .................. 10-2017-0143175

(51) Int. Cl.
*H04B 7/06*  (2006.01)
*H04B 10/50*  (2013.01)
(Continued)

(52) U.S. Cl.
CPC ........... *H04B 7/0456* (2013.01); *H04B 7/043* (2013.01); *H04B 7/0452* (2013.01);
(Continued)

(58) Field of Classification Search
CPC .............. H04B 7/0456; H04B 10/5057; H04B 10/501; H04B 10/572; H04B 7/0695;
(Continued)

(56) References Cited

U.S. PATENT DOCUMENTS 9,451,536 B2    9/2016  Ryu et al.
9,941,940 B2 *  4/2018  Wang .................. H04B 7/0408
(Continued)

OTHER PUBLICATIONS

Shinpei Yasukawa et al., "D2D Communications in LTE-Advanced Release 12", NTT DOCOMO Technical Journal vol. 17 No. 2, Oct. 2015, pp. 56-64.

*Primary Examiner* — Brandon J Miller
(74) *Attorney, Agent, or Firm* — Rabin & Berdo, P.C.

(57) ABSTRACT

A radio link setup method performed by a first communication node constituting a wireless communication network may comprise transmitting a first master discovery signal including a first sector identifier and a first beam index of the first communication node to a second communication node by using a master sector among a plurality of sectors of the first communication node; receiving a first slave discovery signal including a second sector identifier and a second beam index of the second communication node receiving the first master discovery signal; in response to the first slave discovery signal, transmitting a feedback message including the second sector identifier and the second beam index to the second communication node; and determining a beam for transmission and reception with the second communication node based on the first sector identifier, the first beam index, the second sector identifier, and the second beam index.

15 Claims, 12 Drawing Sheets

(51) Int. Cl.
*H04W 16/28* (2009.01)
*H04W 28/18* (2009.01)
*H04W 72/04* (2009.01)
*H04B 10/572* (2013.01)
*H04B 7/0426* (2017.01)
*H04B 7/0452* (2017.01)
*H04B 7/0456* (2017.01)

(52) U.S. Cl.
CPC ......... *H04B 7/0639* (2013.01); *H04B 7/0695* (2013.01); *H04B 10/501* (2013.01); *H04B 10/5057* (2013.01); *H04B 10/572* (2013.01); *H04W 16/28* (2013.01); *H04W 28/18* (2013.01); *H04W 72/046* (2013.01)

(58) Field of Classification Search
CPC .... H04B 7/0639; H04B 7/0452; H04B 7/043; H04W 16/28; H04W 28/18; H04W 72/046

See application file for complete search history.

(56) References Cited

U.S. PATENT DOCUMENTS

| | | | |
|---|---|---|---|
| 2011/0205969 A1* | 8/2011 | Ahmad | H04W 16/28 370/328 |
| 2015/0230263 A1* | 8/2015 | Roy | H04W 16/28 455/452.2 |
| 2015/0326359 A1 | 11/2015 | Subramanian et al. | |
| 2016/0174244 A1 | 6/2016 | Kim et al. | |
| 2018/0124859 A1* | 5/2018 | Cho | H04W 76/12 |

* cited by examiner

<FDD>

<TDD>

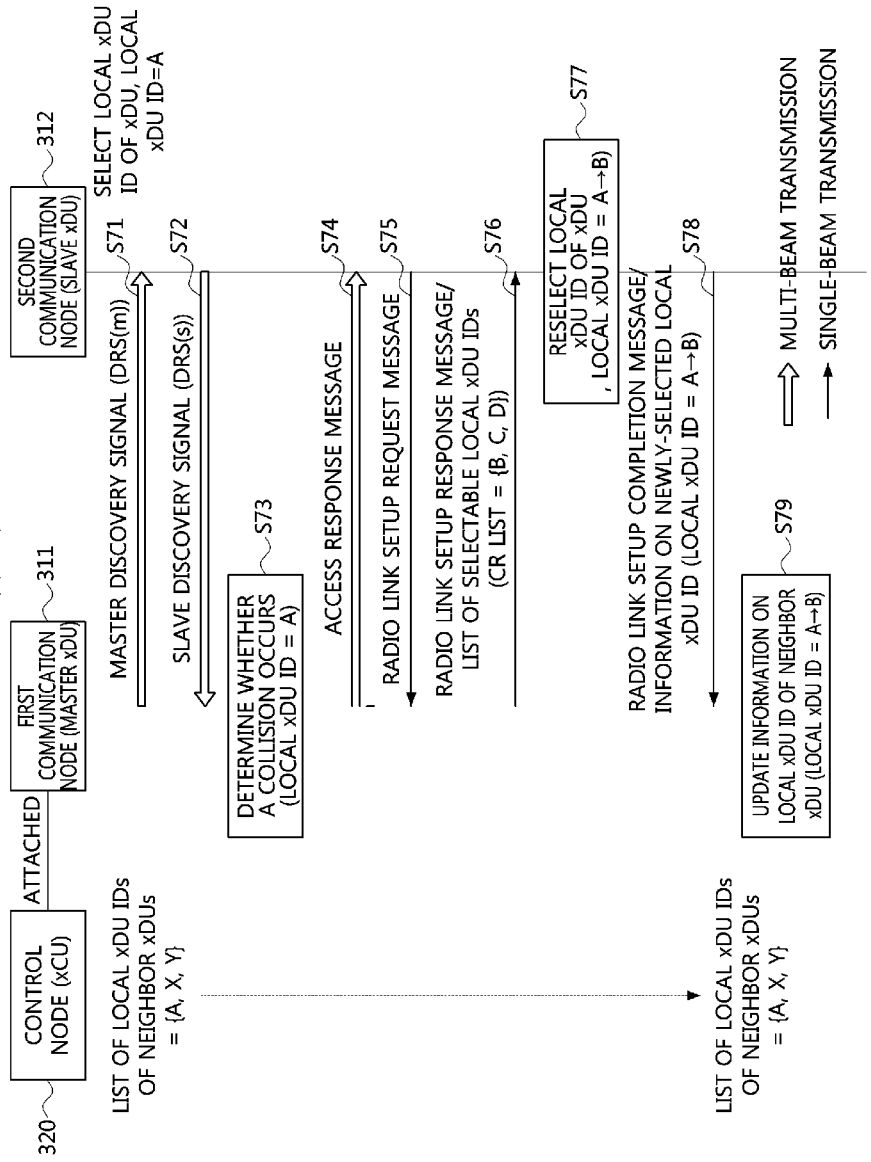

METHOD OF TRANSMITTING DISCOVERY SIGNAL AND RADIO LINK SETUP METHOD USING THE SAME

CROSS-REFERENCE TO RELATED APPLICATIONS

This application claims priorities to Korean Patent Applications No. 10-2016-0144785 filed on Nov. 1, 2016 and No. 10-2017-0143175 filed on Oct. 31, 2017 in the Korean Intellectual Property Office (KIPO), the entire contents of which are hereby incorporated by reference.

BACKGROUND

1. Technical Field

The present disclosure relates to a radio link setup, and more specifically, to a method of transmitting discovery signals for setting up a radio link between communication nodes constituting a wireless communication network, and a method of setting up a radio link using the same.

2. Related Art

In case that a wireless communication network is formed as a mobile communication network, communication nodes may include a base station (e.g., eNB) and a terminal (e.g., user equipment (UE)), a relay, and the like. In a conventional Long Term Evolution (LTE) or LTE-Advanced (LTE-A) system, a discovery procedure and a radio link setup procedure may correspond to an initial access procedure between the base station and the terminal. Also, they may corresponds to a discovery signal transmission and reception procedure for discovery between adjacent terminals and a direct link setup procedure for a direct link between the terminals (e.g., LTE side link) in Device-to-Device (D2D) communications.

The initial access procedure between the base station and the terminal may include a cell search procedure (Hereinafter, also referred to as 'cell discovery procedure') in which the terminal receives a discovery signal (synchronization signal and system information) periodically transmitted by the base station and identifies the base station, and may include a random access (RA) procedure performed by the terminal for a selected base station. That is, in the cell search procedure, the base station performs transmission of the discovery signal, and the terminal performs the operation of receiving the discovery signal and identifying the base station.

In the radio link setup procedure, the terminal may request a radio link setup by transmitting an RA preamble (RAP) and an associated message. Then, the base station may perform a role of controlling the corresponding link setup procedure in response to the radio link setup request. Here, identification of the terminal by the base station may be performed during establishment of a radio resource control (RRC) connection through the random access procedure. In the D2D communications, each terminal periodically transmits and receives a discovery signal in the same manner, and identification of other terminals may be performed by receiving discovery signals transmitted from other terminals. If a radio link setup request is made by a terminal that has identified another terminal in the vicinity, a radio link setup procedure may be performed.

In order to accommodate increasing data traffic in next-generation mobile communication networks beyond the LTE/LTE-A system, use of millimeter-wave (e.g., 30 to 300 Ghz) bands, which allows for the allocation of wider frequency bands, is being considered. Large path loss may occur in the millimeter-wave bands as compared with microwave bands (e.g., sub-6 GHz) of the conventional LTE/LTE-A system. Directional communication through multi-antenna beamforming techniques is being developed to solve such the large path loss of the millimeter-wave bands to ensure the existing cell coverage. The beamforming techniques in the millimeter-wave bands should be applied to both a transmitter and a receiver, and may have characteristics that performance varies sensitively according to the direction of the beam formed at the transmitter and the receiver.

Accordingly, in order to form a radio link having a stable quality, a process (i.e., beam training) of finding a pair of transmission beam and reception beam that forms an optimal channel between the base station and the terminal is indispensably required. Therefore, in the next generation wireless communication system considering millimeter-wave, unlike in the existing LTE/LTE-A system, a consideration for transmission and reception beam training process is required during the discovery and radio link setup procedure between the base station and the terminal.

Also, in case of a small cell technology considered to accommodate the increasing data traffic, installing a high-speed/high-capacity wireless backhaul through the millimeter-wave bands is being considered due to difficulties of installing wired backhaul for a large number of small cells. In order to provide a wireless backhaul through millimeter-wave bands, a radio link between transmission nodes constituting the wireless backhaul is required similarly to an access link between the base station and the terminal. That is, a procedure for discovering neighbor transmission nodes and a procedure for setting up radio links between the identified transmission nodes are required.

SUMMARY

Accordingly, embodiments of the present disclosure provide methods of transmitting a discovery signal for setting up a radio link between communication nodes in a wireless communication network using millimeter-wave bands or microwave bands.

Accordingly, embodiments of the present disclosure also provide methods of setting up a radio link between communication nodes in a wireless communication network using millimeter-wave bands or microwave bands.

In order to achieve the objective of the present disclosure, a radio link setup method performed by a first communication node connected to a wireless communication network may comprise transmitting a first master discovery signal including a first sector identifier and a first beam index of the first communication node to a second communication node by using a master sector among a plurality of sectors of the first communication node; receiving a first slave discovery signal including a second sector identifier and a second beam index of the second communication node, which has received the first master discovery signal; in response to the first slave discovery signal, transmitting a feedback message including the second sector identifier and the second beam index to the second communication node; and determining a beam for transmission and reception with the second communication node based on the first sector identifier, the first beam index, the second sector identifier, and the second beam index.

The method may further comprise receiving a radio link setup request message from the second communication node, which has received the feedback message; and in response to the radio link setup request message, transmitting a radio link setup response message to the second communication node by using the determined beam.

The first slave discovery signal may be received through the master sector.

The first slave discovery signal may be used for an initial access request, and the feedback message may be transmitted as included in an access response message for the initial access request.

The method may further comprise transmitting resource allocation information for setting up a radio link to the second communication node.

In the transmitting a radio link setup response message, when slave discovery signals transmitted from a plurality of sectors of the second communication node are received, a sector having the highest received signal strength at the first communication node may be selected from the plurality of sectors, and the radio link setup response message may be transmitted to the selected sector.

The first master discovery signal may include a first local identifier of the first communication node, and the first slave discovery signal may include a second local identifier of the second communication node.

The method may further comprise determining whether one of local identifiers of neighbor communication nodes managed by the first communication node collides with the second local identifier after receiving the first slave discovery signal; and in response to determination that one of local identifiers of the neighbor communication nodes collides with the second local identifier, transmitting, to the second communication node, a list of local identifiers which are not used by the neighbor communication nodes.

The method may further comprise receiving, from the second communication node, a new local identifier selected from the list of local identifiers; and updating information on the local identifier of the second communication node based on the new local identifier.

The method may further comprise receiving a second slave discovery signal from a neighbor communication node through a sector in idle state in which a radio link is not set up with the neighbor communication node; and in response to the second slave discovery signal, transmitting, to the neighbor communication node, a feedback message including a sector identifier and a beam index included in the received second slave discovery signal through the sector in idle state.

In order to achieve the objective of the present disclosure, an operation method of a communication node constituting a wireless communication network may comprise determining an operation mode of each of a plurality of sectors having different directionalities of the first communication node according to whether each of the plurality of sectors is connected to the wireless communication network and whether each of the plurality of sectors has set up a radio link with a neighbor communication node; and transmitting a discovery signal according to the operation mode of each of the plurality of sectors.

The method may further comprise setting up, by the plurality of sectors, a plurality of radio links simultaneously with sectors of different communication nodes.

Each of the plurality of sectors may operate in master mode when each of the plurality sectors is connected to the wireless communication network and has set up a radio link with a neighbor communication node, operate in idle mode when each of the plurality sectors is connected to the wireless communication network but has not set up a radio link with a neighbor communication node, and operate in slave mode when each of the plurality sectors is not connected to the wireless communication network.

In the transmitting a discovery signal, the discovery signal may be transmitted periodically from each sector according to the operation mode of each of the plurality of sectors.

In the transmitting a discovery signal, the discovery signal may be transmitted non-periodically from each sector according to the operation mode of each of the plurality of sectors.

In order to achieve the objective of the present disclosure, a radio link setup method performed by a second communication node requesting to access a first communication node connected to a wireless communication network may comprise transmitting a slave discovery signal including a first sector identifier and a first beam index of the second communication node to the first communication node by using a slave sector among a plurality of sectors of the second communication node; receiving a first feedback message including a second sector identifier and a second beam index of the first communication node from the first communication node which has received the slave discovery signal; in response to the first feedback message, transmitting a second feedback message including the second sector identifier and the second beam index of the first communication node to the first communication node; and determining a beam for transmission and reception with the first communication node based on the first sector identifier, the first beam index, the second sector identifier, and the second beam index.

The method may further comprise transmitting a radio link setup request message to the first communication node by using the determined beam; and receiving a radio link setup response message from the first communication node which has received the radio link setup request message.

The first feedback message transmitted by the first communication node may include timing adjustment information for transmission of other messages after the first feedback message.

The first slave discovery signal may be used for an initial access request, and the first feedback message including an access response message for the initial access request may be received by the second communication node.

When the access response messages are received from a plurality of sectors of the first communication node, a sector having the highest received signal strength at the second communication node may be selected from the plurality of sectors of the first communication node, and an access indication message may be transmitted to the selected sector.

According to the embodiments of the present disclosure, in a wireless communication network, it is possible to perform discoveries between communication nodes supporting directional communications using beamforming, and set up radio links between the communication nodes identified through the discovery procedure.

BRIEF DESCRIPTION OF DRAWINGS

Embodiments of the present disclosure will become more apparent by describing in detail embodiments of the present disclosure with reference to the accompanying drawings, in which:

FIG. 15 is a diagram illustrating another example of collision resolution of local IDs between a master xDU and a slave xDU.

DETAILED DESCRIPTION

Figure 1:
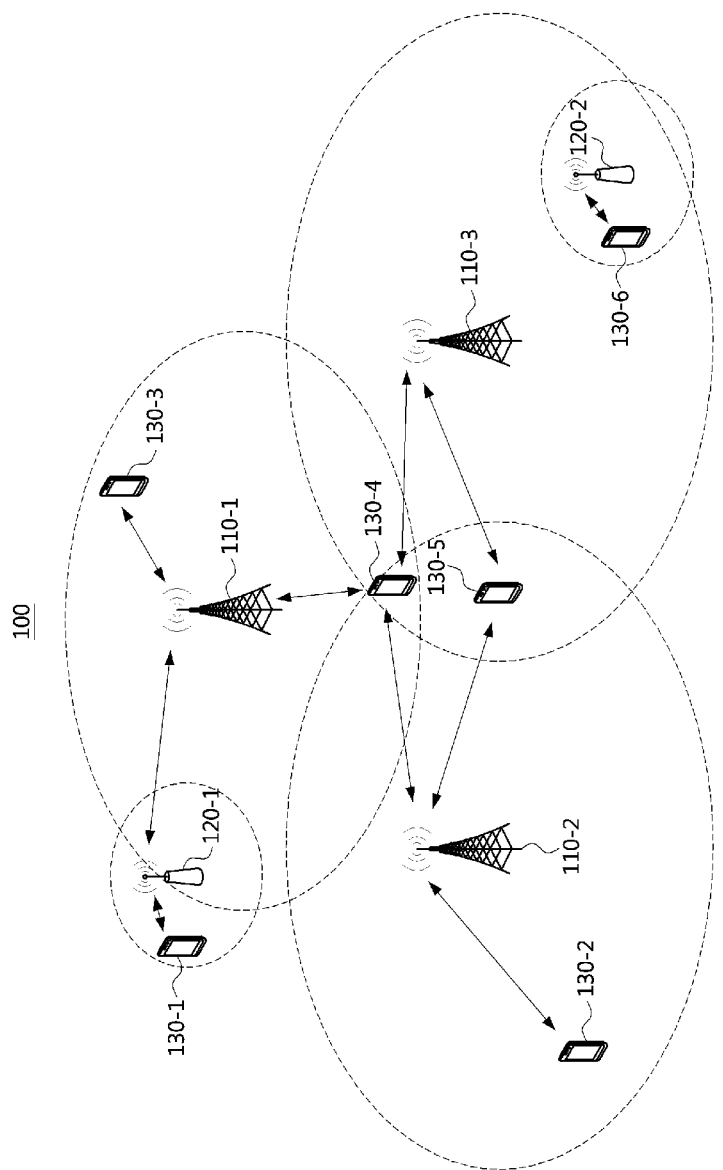
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may also be referred to as a 'communication network', and may comprise a core network (e.g., a serving gateway (S-GW), a packet data network (PDN) gateway (P-GW), a mobility management entity (MME), and the like).

The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
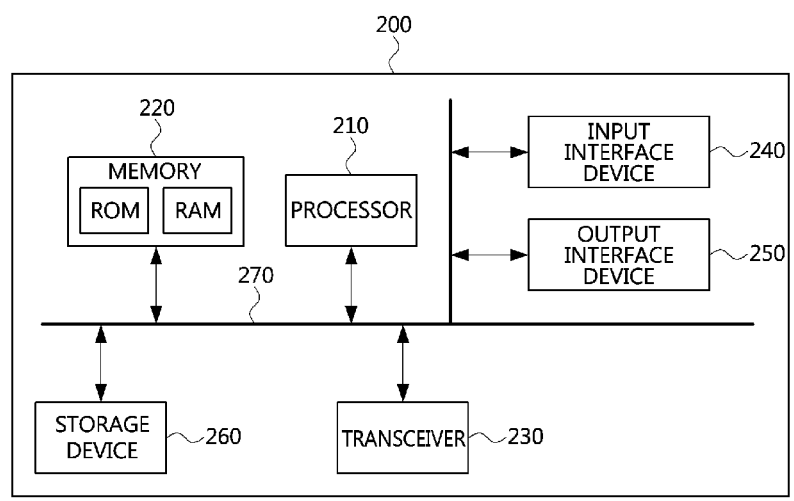
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support cellular communications (e.g., the LTE or the LTE-advanced (LTE-A) defined in the 3GPP). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA based downlink (forward link) transmissions, and SC-FDMA based uplink (reverse link) transmissions. Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3:
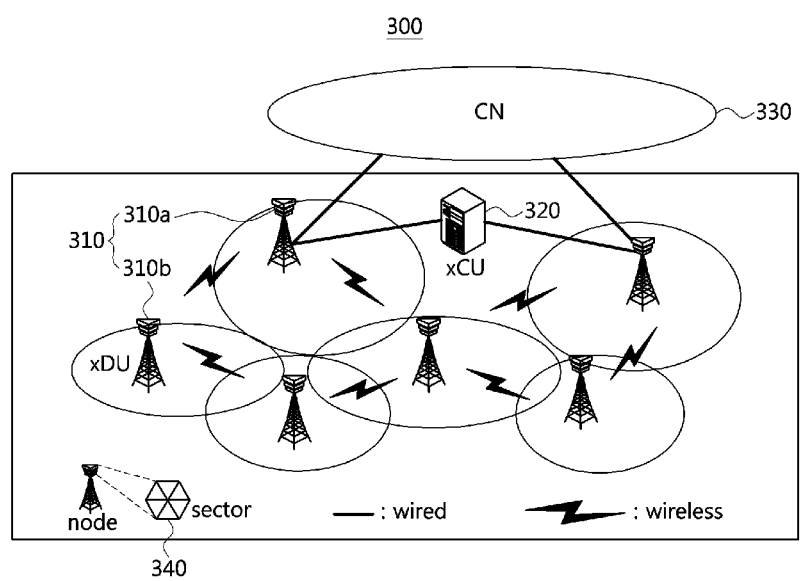
FIG. 3 is a diagram illustrating a configuration of a wireless communication network according to an embodiment of the present disclosure.

FIG. 3 is a diagram illustrating a configuration of a wireless communication network according to an embodiment of the present disclosure.

Referring to FIG. 3, a mobile communication network (i.e., mobile xhaul network (MXN)) 300 according to an embodiment of the present disclosure may comprise a plurality of communication nodes (i.e., xhaul distributed units (xDUs)) (e.g., 310) for transmitting and receiving data through radio links, a control node (i.e., xhaul centralized unit (xCU)) (e.g., 320), and a core network (CN) 330.

In the MXN 300, some of the xDUs may be connected to the CN 330 in a wired manner, and the remaining xDUs may be connected to other xDUs and the CN 330 via radio links. Also, radio link setup methods according to embodiments of the present disclosure may support connections among the xDUs and connections of the xDUs to the CN 330.

The MXN 300 may provide, in a wireless manner using millimeter-wave, a backhaul network that connects an xDU (e.g., a base station) and the CN 330 in addition to a radio access network (RAN) between a base station and a terminal in the LTE/LTE-A system. Also, the MXN 300 may provide, in a wireless manner using millimeter-wave, a fronthaul network that connects a digital apparatus (e.g., a baseband unit (BBU) or a distributed unit (DU)) and a radio unit (e.g., a radio remote head (RRH)) in a cloud-RAN (C-RAN). Also, the MXN 300 may provide a backhaul connection with a small cell base station installed within coverage of a macro base station connected to the CN 330 in the LTE/LTE-A system in a wireless manner.

Hereinafter, a method for transmitting a discovery signal for setting up a radio link and a method for setting up a radio link will be described with reference to a wireless backhaul network forming a backhaul link for providing the backhaul. However, in case that the xDU 310 is a base station, the method of transmitting a discovery signal for setting up a radio link and the method for setting up a radio link may be applied to an access link between a base station and a terminal.

Here, the xDU (e.g., 310a) having a wired connection may be a base station, and the xDU (e.g., 310b) having no wired connection may be a terminal or a base station. The present disclosure mainly focuses upon a method of transmitting a discovery signal at the xDU 310 and a method of setting up a radio link between the xDUs 310. Also, in the MXN 300, backhaul data and fronthaul data may be transmitted and received to and from the CN 330.

The xCU 320 may perform management on states (i.e., connected state or released state) of the plurality of xDUs, transmission and reception path management of data in the network, mobility management of the xDUs, and the like. For this, the xCU 320 may exchange relevant information with the xDUs.

The xDUs may be classified into a mobile type connected to a base station or a RRH installed in a place having mobility such as a train and a bus, and a fixed type connected to a base station or a RRH installed in a fixed place. Here, some of the fixed type xDUs may have wired connections with the CN.

In case of using beamforming, each of the xDUs may be composed of a plurality of sectors 340 each of which is responsible for transmission and reception in a predetermined direction. A separate function part (e.g., an XDU control part) may perform the overall management of the XDU composed of the plurality of sectors 340. For example, the separate function part may perform management of communication node identification information, selection of transmission frequency, management of information on neighbor communication nodes (i.e., neighbor list), and connection management with the xCU 320.

In the MXN 300, paths for transmitting and receiving data to the CN 330 may be configured in a multi-hop manner. A final hop on the path to the CN 330 may be handled by the xDU (e.g., 310a) having a wired connection to the CN 330. It is necessary to set up a radio link between the xDUs constituting each hop in the path. For this, a discovery procedure for the xDUs to identify each other may be performed first.

Discovery Procedure Between xDUs

The following identification information may be used to identify each xDU in the MXN 300.

(1) an identifier (e.g., xDU ID) for identifying an xDU in the network (2) a local identifier (e.g., local xDU ID of m bits) for identifying an xDU in a partial area within the network (3) an identifier (e.g., beam index) of transmission beam The identifiers used to identify an xDU in the MXN 300 may include a communication node identifier (e.g., xDU ID of n bits) that can identify the xDU uniquely in the MXN 300, and a communication node local identifier (e.g., local xDU ID of m bits) that can identify the xDU uniquely in a partial area within the MXN 300.

In case that the xDU makes an attach request to the xCU 320 responsible for controlling the MXN 300, the xCU 320 may assign an identifier (e.g., an E-UTRAN cell identifier (ECI) (i.e., (eNB ID of 20 bits+cell ID of 8 bits)) or a M-TMSI) as the xDU ID to the corresponding xDU.

The local xDU ID, as an identifier to be transmitted over a wireless channel instead of the xDU ID, may have a shorter length than the xDU ID (i.e., m<n).

After a specific xDU (e.g., slave xDU) measures local xDU IDs being used by neighbor xDUs (e.g., master xDU), the specific xDU may select a value that is not being used by the neighbor xDUs. That is, after measuring the local xDU IDs being used by the neighbor xDUs, the specific xDU may determine whether its local xDU ID collides with at least one of the local xDU IDs of the neighbor xDUs. Thereafter, a local xDU ID that is not collided with the neighbor xDUs may be selected and used by the specific xDU. Here, local xDU IDs may be classified into a mobile type and a fixed type, and the xDU may select a local xDU ID of the mobile type or a local xDU ID of the fixed type according its XDU type.

After determining whether the local xDU ID collides with at least one local xDU ID of the neighbor xDUs, if there is a collision, a local xDU ID of the mobile type may preferentially be changed by the xDU. For example, the local xDU ID may correspond to a cell ID group (i.e., one of 0 to 167) of a physical cell identity (PCI) obtained through a secondary synchronization signal (SSS) of the LTE/LTE-A system. Also, a sector ID or sector index for a sector in the xDU may correspond to a cell ID (i.e., one of 0 to 2) of the PCI obtained through a primary synchronization signal (PSS) of the LTE/LTE-A system. A beam index of a transmission beam may be used to distinguish a plurality of beams configurable in the sector.

The discovery procedure among the plurality of xDUs may be performed by transmitting and receiving discovery signals including the above-described identification information according to a unit that controls the radio link setup. For example, such the discovery procedure may be performed in unit of an xDU (e.g., 310) or in unit of a sector within an xDU.

Discovery signals including the identifiers of each beam may be transmitted sequentially through all the beams configurable in an xDU or a sector within an xDU. Here, a beam sweeping operation may be performed to discover the directions of transmitting and receiving of discovery signals.

As an example, a discovery procedure may be performed on an xDU basis. In this case, a node discovery using identifiers (xDU ID or local xDU ID) for distinguishing xDUs may be performed. Also, a direction discovery using sector identifiers (sector ID or sector index) for distinguishing a plurality of sectors and beam indexes for distinguishing a plurality of beams may be performed.

As another example, a discovery procedure may be performed on a basis of a sector within an xDU. In this case, the xDU may perform a discovery in two stages. First, the xDU may perform a node discovery having a wide range of directionality in a first stage by using identifiers ((xDU ID or local xDU ID)+sector index) for distinguishing a plurality of sectors. Then, the xDU may perform a direction discovery having a fine directionality in a second stage by using beam indexes for distinguishing a plurality of beams in a sector.

Hereinafter, a method of transmitting a discovery signal for setting up a radio link and a radio link setup method performed by each xDU in consideration of directional communications through beamforming will be described.

Each of the plurality of xDUs may include a plurality of sectors (e.g., 340) through which each of the plurality of xDUs may set up radio links with other respective xDUs at the same time.

When an xDU sets up a radio link, according to whether each sector of the xDU is connected to the network or not and whether each sector of the xDU has set up a radio link or not, an operation mode (e.g., master mode, slave mode, or idle mode) of each sector of the xDU may be determined. According to the operation mode of each sector, a transmission manner and a transmission type of discovery signals may be determined.

In case that the sector of the xDU operates in the master mode, the sector may perform, as connected to the MXN 300, controls on radio links already set up with other xDUs. In this case, the sector operating in the master mode may transfer a new access request from another nearby xDU to the MXN 300. For this, the xDU in the master mode may newly set up a radio link with the xDU requesting the access, and may perform control for setting up a radio link.

In case that the sector of the xDU operates in the slave mode, the sector operating in the slave mode may receive a control signal from a master sector of another xDU, and perform control on a radio link set up with a sector of another xDU.

Meanwhile, a sector in which a radio link is not set up with another xDU, among sectors connected to the MXN 300, may operate in the idle mode.

Figure 4:
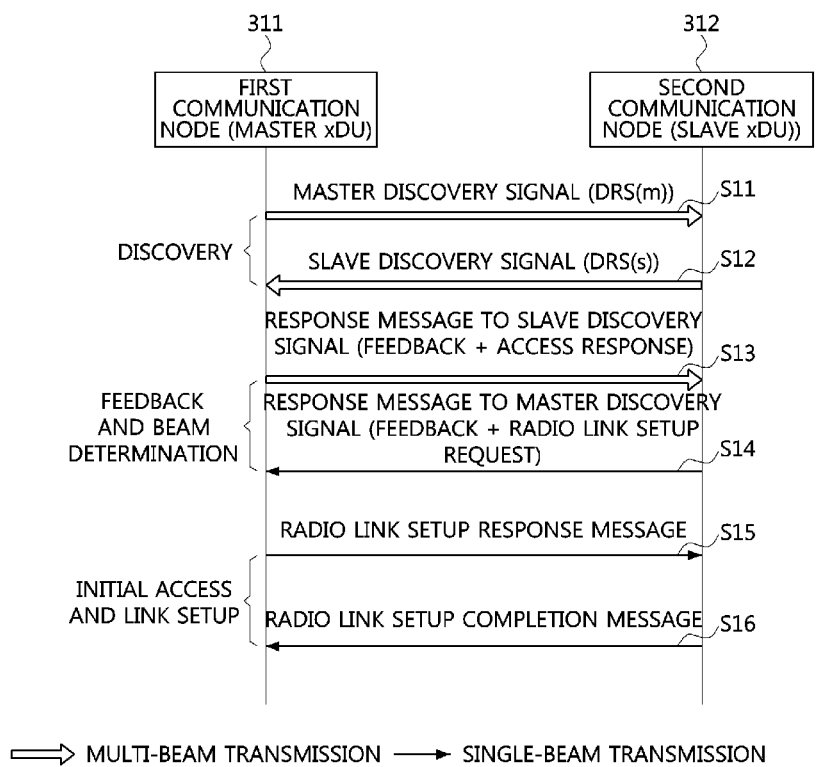
FIG. 4 is a diagram illustrating a method of transmitting a discovery signal for setting up a radio link and a radio link setup method according to a first embodiment of the present disclosure.

FIG. 4 is a diagram illustrating a method of transmitting a discovery signal for setting up a radio link and a radio link setup method according to a first embodiment of the present disclosure.

Referring to FIG. 4, transmission and reception of a discovery signal (DRS) may be performed between a first xDU 311 (i.e., master xDU) and a second xDU 312 (i.e., slave xDU).

Specifically, the first xDU 311 (master xDU) may transmit its own discovery signal (hereinafter, referred to as 'DRS (m)') to the xDU 312 (slave xDU) in order to assist discovery operations of the second xDU 312 (S11). Hereinafter, the discovery signal DRS(m) transmitted from the first xDU 311 to the neighbor slave xDU may be referred to as a 'master discovery signal'. The master discovery signal may include a first node identifier of the first xDU 311, a first sector identifier for identifying a sector among a plurality of sectors of the first xDU 311, and a first beam index for identifying at least one beam of a plurality of beams in each sector of the first xDU 311.

Subsequently, the second xDU 312 may transmit its discovery signal (hereinafter, referred to as 'DRS(s)') to the first xDU 311 after receiving a DRS(m). Hereinafter, the discovery signal DRS(s) transmitted from the second xDU 312 to the neighbor master xDU may be referred to as a 'slave discovery signal'. The slave discovery signal may include a second node identifier of the second xDU 312, a second sector identifier for identifying a sector among a plurality of sectors of the second xDU 312, and a second beam index for identifying at least one beam among a plurality of beams in each sector of the second xDU 312.

Then, the first xDU 311 may transmit a response message to the received slave discovery signal of the second xDU 312. Here, the first xDU 311 may transmit a response message to the slave discovery signal and transmit an access response message.

Specifically, among sectors of the first xDU 311 which are connected to the MXN 300, sectors operating in the master or idle mode may receive the slave discovery signal DRS(s) transmitted from the nearby second xDU 312.

In the step S13, the first xDU 311 may transmit a first feedback message and an access response message to the DRS(s) to the second xDU 312.

Here, a master sector of the first xDU 311 may make the first feedback message include the second sector identifier and the second beam index of the second xDU 312 which are included in the received DRS(s). Also, the master sector of the first xDU 311 may then transmit the first feedback message to the slave sector of the second xDU 312.

For example, since the slave discovery signal DRS(s) transmitted from the second xDU 312 corresponds to an initial access request, the master sector of the first xDU 311 receiving the DRS(s) may transmit the first feedback message. Here, the first feedback message may be transmitted as included in an initial access response message (i.e., 'A_Res' message). Here, the first feedback message transmitted from the master sector of the first xDU 311 may include the second node identifier, the second sector identifier, and the second beam index of the second xDU 312. In this case, the second beam index may further include a best beam index indicating the optimal beam among the plurality of beams in the sector.

After the step S13, the second xDU 312 may transmit a response to the master discovery signal DRS(m) received from the first xDU 311. Here, the second xDU 312 may respond to the master discovery signal and determine a transmission and reception beam to be used with the first xDU 311. Also, the second xDU 312 may transmit a radio link setup request to the first xDU 311 (S14).

Also, the slave sector of the second xDU 312 that has transmitted the slave discovery signal DRS(s) together with the initial access request may perform transmission of other messages after the slave discovery signal DRS(s) according to timing adjustment (TA) information included in the first feedback message. Also, the first xDU 311 (e.g., master xDU) may include grant information on a resource allocated for the transmission of other messages of the second xDU (e.g., slave xDU) attempting the initial access in the first feedback message.

Here, the first feedback message transmitted from the first xDU 311 or the second feedback message transmitted from the second xDU 312 may be transmitted through a beam sweeping operation that performs transmissions sequentially through all the beams in the sector. Also, the A_res message may be transmitted through a beam sweeping operation that sequentially transmits through all the beams in the sector. When the DRS(s) and the DRS(m) are transmitted and received with a best beam index added thereto, the beam sweeping operation may not be performed, but the messages may be transmitted through the optimal beam identified by the best beam index.

Specifically, after the step S13, the slave sector of the second xDU 312 may determine whether the first feedback message received from the first xDU 311 includes the second sector identifier and the second beam index.

The slave sector of the second xDU 312 may then transmit the second feedback message to the DRS(m) to the master sector of the first xDU 311 (S14). Here, the feedback message transmitted from the sector of the second xDU 312 may correspond to an access indication message (i.e., 'A_Ind' message) for confirming reception of the initial access response message.

The second xDU 312 may select a beam for data transmission and reception with the master sector of the first xDU 311 based on the transmission beam index identified through the first feedback message or access response message received from the master sector. Also, the second xDU 312 may then transmit the second feedback message or the A_Ind message to the first xDU 311 (master xDU) via the selected beam.

After receiving a radio link setup request from the second xDU 312, the first xDU 311 may set up a radio link with the second xDU 312, and may transmit a response message to the radio link setup request (S15). Here, the first xDU 311 may transmit and receive the messages for setting up a radio link with the second xDU 312 through a discovered direction.

The second xDU 312 may then set up a radio link with the first xDU 311 and transmit a radio link setup completion message to the first xDU 311 (S16).

Here, the second xDU 312 may transmit and receive messages for setting up a radio link with the first xDU 311 through the discovered direction.

Since the beam for data transmission and reception is not yet determined between the first xDU 311 and the second xDU 312 in the steps S11 to S13, the messages may be exchanged between the first xDU 311 and the second xDU 312 through multiple beams. On the other hand, in the steps S14 to S16, the messages may be exchanged between the first xDU 311 and the second xDU 312 through the beam (single beam) selected by the first xDU 311 and the second xDU 312.

Figure 5:
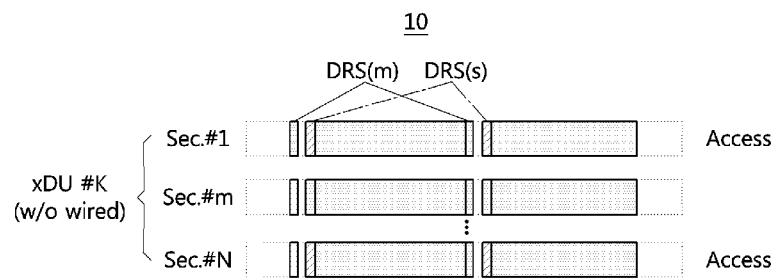
FIG. 5 is a diagram illustrating a type of a discovery signal for each sector of a communication node according to a first embodiment of the present disclosure.
Figure 6:
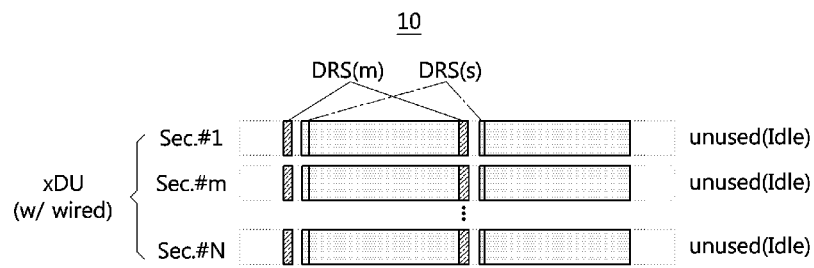
FIG. 6 is a diagram illustrating a type of a discovery signal for each sector of a communication node according to a second embodiment of the present disclosure.
Figure 7:
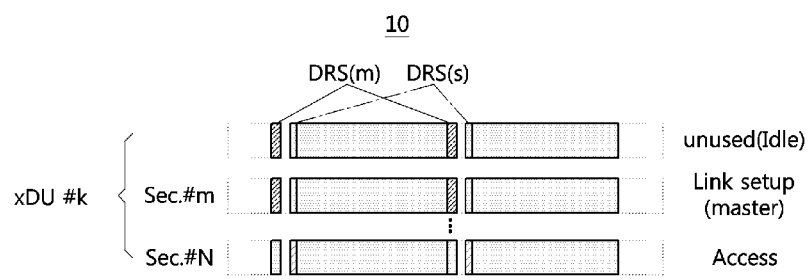
FIG. 7 is a diagram illustrating a type of a discovery signal for each sector of a communication node according to a third embodiment of the present disclosure.

FIG. 5 is a diagram illustrating a type of transmission for discovery signal for each sector of a communication node according to a first embodiment of the present disclosure, FIG. 6 is a diagram illustrating a type of transmission for discovery signal for each sector of a communication node according to a second embodiment of the present disclosure, and FIG. 7 is a diagram illustrating a type of transmission for discovery signal for each sector of a communication node according to a third embodiment of the present disclosure.

Referring to FIGS. 5 to 7, three types of transmission for discovery signals (discovery reference signal (DRS)) are shown. The type of transmission for the DRS may vary according to transmission conditions of the sector of the xDU. The discovery signal of FIG. 5 may be transmitted and received for accesses between xDUs at initial state, and the discovery signal of FIG. 6 may be transmitted by a sector operating in the idle mode at initial state. The discovery signal of FIG. 7 may be periodically transmitted in a sector operating in the idle mode and a sector operating in the master mode at normal state. Also, for the initial access, discovery signals may be transmitted by a part of the slave sectors.

According to whether the xDU is connected to the network or not and whether a radio link with a neighbor xDU is set up or not, an operation mode of each sector constituting the xDU may be determined. In this case, each sector may have different directionality, and the transmission manner and transmission type of each sector may vary according to the operation mode of each sector. The xDU may transmit specific discovery signals to neighbor xDUs according to the operation mode of the respective sectors. After the discovery procedure with neighbor xDUs, each sector of the xDU may set up a plurality of radio links with sectors of different xDUs at the same time.

Each of the plurality of sectors may operate in a master mode when it is connected to the wireless communication network and a radio link is set up with a neighbor xDU, operate in a slave mode when it is not connected to the wireless communication network, and operate in an idle mode when it is connected to the wireless communication network but a radio link is not set up with a neighbor xDU. In the step of transmitting the discovery signal at each of the plurality of sectors of the xDU, the discovery signal transmitted may include same information. Here, the discovery signal may be transmitted periodically or aperiodically according to the operation mode of each of the plurality of sectors.

As shown in FIG. 4, the DRS transmitted by the sectors of the first xDU 311 which are already attached to the MXN 300 may be defined as a master discovery signal DRS(m). Also, the DRS transmitted by the sectors of the second xDU 312 which are attempting to access the MXN 300 may be defined as a slave discovery signal DRS(s).

The master discovery signal DRS(m) may be transmitted periodically from sectors of the first xDU 311, which are in the master mode or the idle mode and are already attached to the MXN 300. Also, in case that the second xDU 312 attempting to connect to the MXN 300 receives the DRS(m), sectors of the second xDU node 312, which are in the slave mode, may transmit the DRS(s).

In order to transfer a new access request of the neighbor second xDU 312 to the CN 330, the master sector of the first xDU 311 may newly set up a radio link with the second xDU 312, and perform control on the radio link setup.

Meanwhile, the sector operating in the idle mode among the sectors of the first xDU 311 may periodically transmit the master discovery signal DRS(m) to neighbor xDUs. In this way, it may inform the neighbor xDUs that the sector operating in the idle mode may operate in the master mode later.

In case that the sector operating in the idle mode receives the slave discovery signal DRS(s) from the sector of the neighbor xDU, the sector may change its operation mode to the master mode after it set up a radio link with the neighbor xDU. Thereafter, the sector whose operation mode has been changed from the idle mode to the master mode may transmit the master discovery signal DRS(m) to the neighbor xDU after. Here, the sector of the xDU that transmitted the DRS(s) may set up a radio link with the master sector of the neighbor xDU. Also, the sector of the xDU that has transmitted the slave discovery signal DRS(s) may operate in the slave mode under the control of the master sector after the radio link is set up.

The type of the discovery signal may be classified into the master discovery signal and the slave discovery signal according to an entity transmitting the discovery signal, but the configurations of the master discovery signal and the slave discovery signal may be the same.

The discovery signal transmitted for the node discovery and direction discovery may include information for discriminating sectors of each xDU transmitting the discovery signal (i.e., pSector ID (local XDU ID+sector index) or Sector ID (XDU ID+sector index)) and information on a beam configurable in the sector (i.e., beam index).

In the conventional LTE/LTE-A system, access related information (e.g., cell identity, access restriction information, etc.) among system information (SI), which is transmitted through a synchronization channel and a broadcast channel, may be similar to the discovery signal of the present disclosure. That is, the pSector ID and the Sector ID may represent the cell identity, and the DRS(s) type may represent the access restriction information. In comparison with the conventional LTE/LTE-A system, a sector identifier and a beam index for direction discovery are added to the discovery signal of the present disclosure. Also, an orthogonal sequence for the discovery signal may be selected and transmitted on a wireless channel at each xDU.

The node discovery procedure and the direction discovery procedure performed through the discovery signal in the xDU may be performed simultaneously or sequentially.

In case that the node discovery and direction discovery procedures are simultaneously performed in the xDU, the discovery signal DRS may be transmitted as one orthogonal sequence including both the node identifier and the beam index. Here, a beam sweeping operation may be performed on all configurable beams in the sector of the xDU for the direction discovery. As an example, a beam sweeping operation, in which orthogonal sequences determined for respective beams are transmitted, may be performed.

In case that the node discovery and direction discovery procedures are sequentially performed in the xDU, an orthogonal sequence portion (DRS-I) for the node discovery may be transmitted first, and then an orthogonal sequence portion (DRS-II) for the direction discovery may be transmitted separately. Here, the direction discovery procedure between identified xDUs may be performed through a beam sweeping operation in which all configurable beams are transmitted sequentially.

Figure 8A:
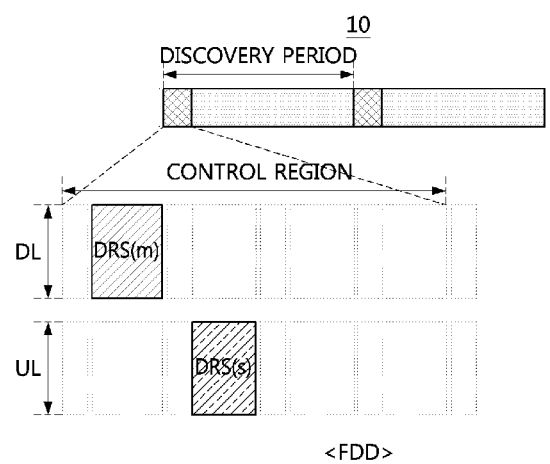
FIGS. 8A and 8B are diagrams illustrating radio resource configurations of a master discovery signal DRS(m) and a slave discovery signal DRS(S)
Figure 8B:
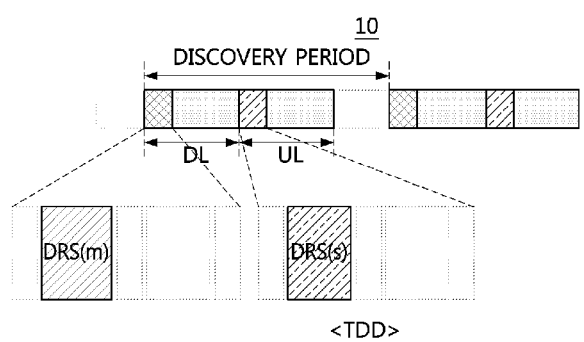
Figure 9:
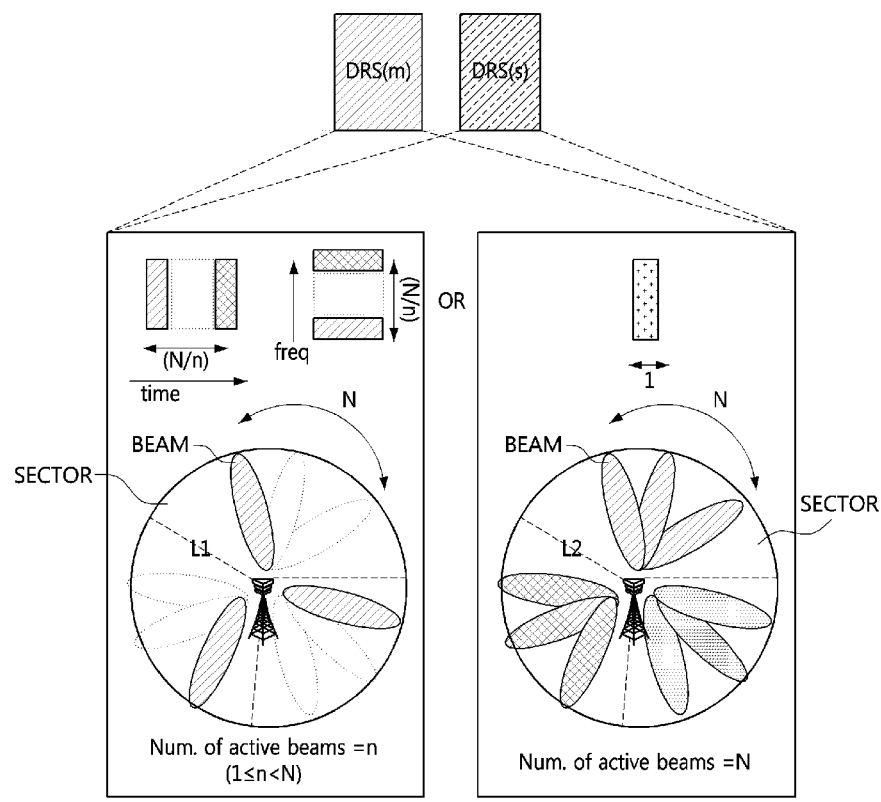
FIG. 9 is a diagram illustrating a detailed radio resource configuration of a discovery signal.

FIGS. 8A and 8B are diagrams illustrating radio resource configurations of a master discovery signal DRS(m) and a slave discovery signal DRS(S), and FIG. 9 is a diagram illustrating a detailed radio resource configuration of a discovery signal.

Referring to FIGS. 8A, 8B, and 9, a radio resource for transmitting a discovery signal may be divided into a transmission resource of the master discovery signal DRS(m) and a transmission resource of the slave discovery signal DRS(s). Here, the transmission resource of the DRS(s) may be determined in relation to the transmission resource of the DRS(m).

The radio resources for transmission of the DRS(m) and the DRS(s) may be configured in consideration of a plurality of beams configurable in the sectors of the xDU. Here, in case that the beam configurations of all the xDUs are the same as configuration of radio resource, available resources for respective beam may be configured in time or frequency.

Meanwhile, in case that the beam configurations of all the xDUs are not the same as configuration of radio resource, the transmission radio resource of a specific beam in each sector may be determined through a modulo operation of the configured resources. For example, the transmission radio resource for the specific beam may be determined as represented in an equation (Resource index=beam index mod M (M: number of resources). Here, if there is one transmission resource configured, simultaneous transmission of all beams may be performed.

Transmission Manner of DRS

When transmitting the DRS, the xDU may transmit the DRS combined with a synchronization signal, or may transmit the DRS as a separate signal. In the case of transmitting the DRS combined with the synchronization signal, the xDU may determine an orthogonal sequence constituting the synchronization signal according to the identification information included in the discovery signal DRS, and transmit the determined orthogonal sequence.

In case that the synchronization signal is transmitted as divided into a plurality of steps, a sequence of the synchronization signal transmitted in each step may be selected using information corresponding to a part of the identification information of the xDU. Therefore, the xDU 310 may transmit the synchronization signal by determining the sequence so that a sequence index of the sequence constituting the synchronization signal corresponds to the identifier of the xDU.

The xDUs in the MXN may not only obtain an identifier of xDU transmitting a synchronization signal but also acquire synchronization of a radio frame by receiving the synchronization signal in the radio frame. In case that the xDU separately transmits the discovery signal, all the xDUs in the MXN may acquire the synchronization of the radio frame according to the separate synchronization signal, and then transmit a separate discovery signal. Considering that a plurality of DRSs can be simultaneously received by an xDU, an orthogonal sequence transmitted through each DRS may be selected according to an identifier of an xDU transmitting the each DRS.

Figure 10A:
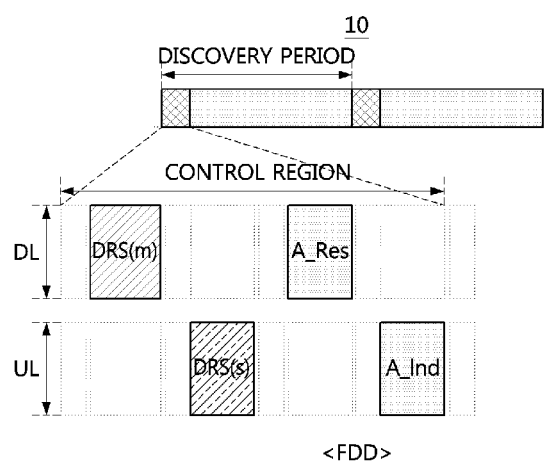
FIGS. 10A and 10B are diagrams illustrating radio resource configurations for transmission of a feedback message and an access procedure message.
Figure 10B:
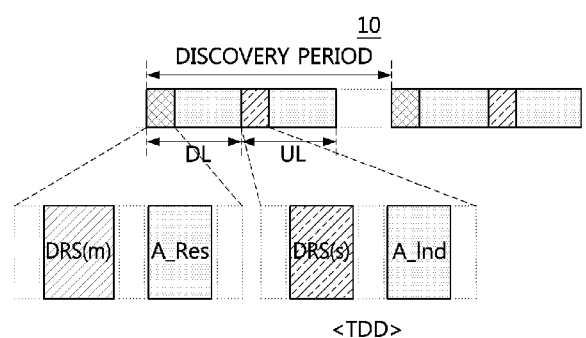

FIGS. 10A and 10B are diagram illustrating radio resource configurations for transmission of a feedback message and an access procedure message.

Referring to FIGS. 10A and 10B, feedback messages (or, access response messages (i.e., A_Res message) and access indication messages (i.e., A_Ind message)) to be transmitted to the nodes discovered for the radio link setup may be transmitted and received at the sector of the xDU. Then, a pair of transmission and reception beams between the two xDUs constituting the radio link may be determined (i.e., beam alignment).

For example, in case that resource allocation information (i.e., grant information) is included in the feedback message (or, A_Res message) transmitted by the master sector is included before the pair of transmission/reception beams is determined, a sector attempting access through the resource indicated by the resource allocation information may transmit a feedback message (or, A_Ind message).

As another example, in case that a resource allocation procedure is applied after the beam alignment and thus the A_Res message does not include the resource allocation information, a fixed transmission radio resource for the A_Ind message in relation to the transmission radio resource for the A_Res message may be determined.

Here, each xDU may transmit and receive the messages by applying a frequency division duplexing (FDD) scheme or a time division duplexing (TDD) scheme, and transmit and receive a DRS, an A_Res message, and an A_Ind message during a discovery period.

Methods of Selecting a Radio Link to be Set Up Among a Plurality of Available Radio Links In case that the DRSs received simultaneously in the sectors in one xDU are transmitted from the sectors of the same xDU, this may be confirmed by a separate function part (i.e., xDU control part) in each xDU. Then, the function part may select only one sector of the xDU attempting to access, and control transmission of an access response message to the selected sector. Also, in case that access responses are simultaneously received from a plurality of master sectors at a slave sector of an xDU attempting to access, the function part may select only one master sector, and control transmission of an access indication message to the selected master sector.

Figure 11:
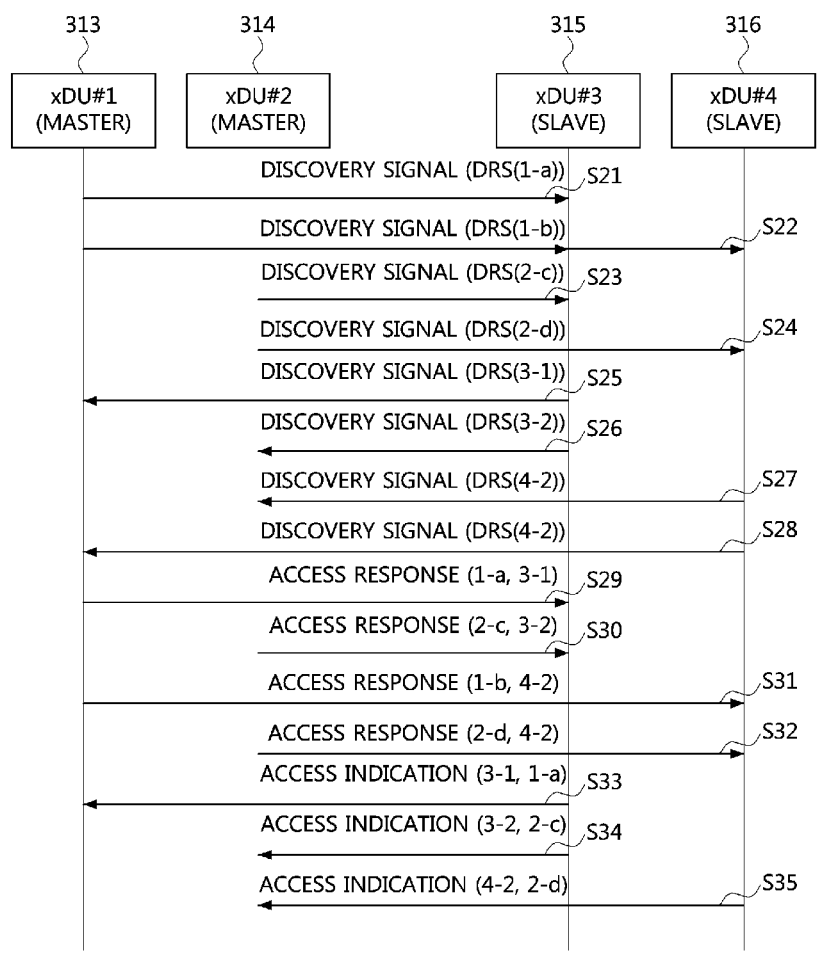
FIG. 11 is a diagram illustrating a method for selecting a radio link to be set up among a plurality of radio links.

FIG. 11 is a diagram illustrating a method for selecting a radio link to be set up among a plurality of available radio links.

Referring to FIG. 11, radio links among a first xDU 313, a second xDU 314, a third xDU 315, and a fourth xDU 316 which are disposed adjacent to each other in the MXN 300 may be set up. Here, each of the first xDU 313, the second xDU 314, the third xDU 315, and the fourth xDU 316 may selectively set one or more radio links among a plurality of available radio links. Here, a radio link may be set up for each sector, and one sector may set up one radio link.

A plurality of slave discovery signals may be received in one master sector of a specific master xDU, and the plurality of slave discovery signals may be transmitted from different slave sectors of adjacent slave xDUs. In this case, the specific master xDU may identify the slave discovery signals received from different slave sectors of adjacent xDUs and select a slave sector with the highest received signal strength. Then, the master xDU may transmit a master discovery signal DRS(m) and an access response message to the slave sector having the highest received signal strength among the plurality of slave sectors of the adjacent xDUs.

Meanwhile, a plurality of access response messages may be received in one slave sector of the slave xDU attempting to access the master xDU, and the plurality of access response messages may be received from different master sectors of a specific master xDU. In this case, the specific slave xDU may identify the master discovery signals received from different master sectors of the master xDU, and select a master sector having the highest received signal strength. Then, the slave xDU may transmit an access indication message to the master sector having the highest received signal strength among the plurality of master sectors of the master xDU.

Specifically, a master discovery signal DRS(1-$a$) may be transmitted from a sector a of the first xDU 313 to a first sector of the third xDU 315 (S21).

Then, a master discovery signal DRS(1-$b$) may be transmitted from a sector b of the first xDU 313 to the first sector of the third xDU 315 and a second sector of the fourth xDU 316 (S22).

Then, a master discovery signal DRS(2-$c$) may be transmitted from a sector c of the second xDU 314 to a second sector of the third xDU 315 (S23).

Then, a master discovery signal DRS(2-$d$) may be transmitted from a sector d of the second xDU 314 to the second sector of the fourth xDU 316 (S24).

The master discovery signal DRS(1-$a$) of the sector a of the first xDU 313 and the master discovery signal DRS(1-$b$) of the sector b of the first xDU 313 may be simultaneously received at the first sector of the third xDU 315 through the steps S21 to S24. Also, the master discovery signal DRS(1-$b$) of the sector b of the first xDU 313 and the master discovery signal DRS(2-$d$) of the sector d of the second xDU 314 may be simultaneously received at the second sector of the fourth xDU 316.

An xDU receiving discovery signals at one sector from different sectors belonging to a same xDU may select one sector and transmit a feedback message and an access request. Also, in case that discovery signals are received at one sector from different xDUs, the xDU receiving the discovery signals may select a sector of an xDU among the different xDUs and transmit a feedback message and an access request to the selected sector.

The third xDU 315 may transmit a slave discovery signal DRS(3-1) of a first sector to the sector a of the first xDU 313 in response to the master discovery signal received from the sector a of the first xDU 313 (S25).

Then, the third xDU 315 may transmit a slave discovery signal DRS(3-2) of a second sector to the sector c of the second xDU 314 in response to the master discovery signal received from the sector c of the second xDU 314 (S26).

Then, the fourth xDU 316 may transmit a slave discovery signal DRS(4-2) of a second sector to the sector d of the second xDU 314 in response to the master discovery signal received from the sector d of the second xDU 314 (S27).

Then, the fourth xDU 316 may transmit a slave discovery signal DRS(4-2) of a second sector to the sector b of the first xDU 313 in response to the master discovery signal received from the sector b of the first xDU 313 (S28).

Then, the sector a of the first xDU 313 may transmit an access response (1-$a$, 3-1) to the first sector of the third xDU 315 (S29).

Then, the sector c of the second xDU 315 may transmit an access response (2-$c$, 3-2) to the second sector of the third xDU 315 (S30).

Then, the sector b of the first xDU 313 may transmit an access response (1-$b$, 4-2) to the second sector of the fourth xDU 316 (S31).

Then, the sector d of the second xDU 314 may transmit an access response (2-$d$, 4-2) to the second sector of the fourth xDU 316 (S32).

Then, the first sector of the third xDU 315 may transmit an access response (3-1, 1-$a$) to the sector a of the first xDU 313 (S33).

Then, the second sector of the third xDU 315 may transmit an access response (3-2, 2-$c$) to the sector c of the second xDU 314 (S34).

Then, the second sector of the fourth xDU 316 may transmit an access response (4-2, 2-$d$) to the sector d of the second xDU 314.

Figure 12:
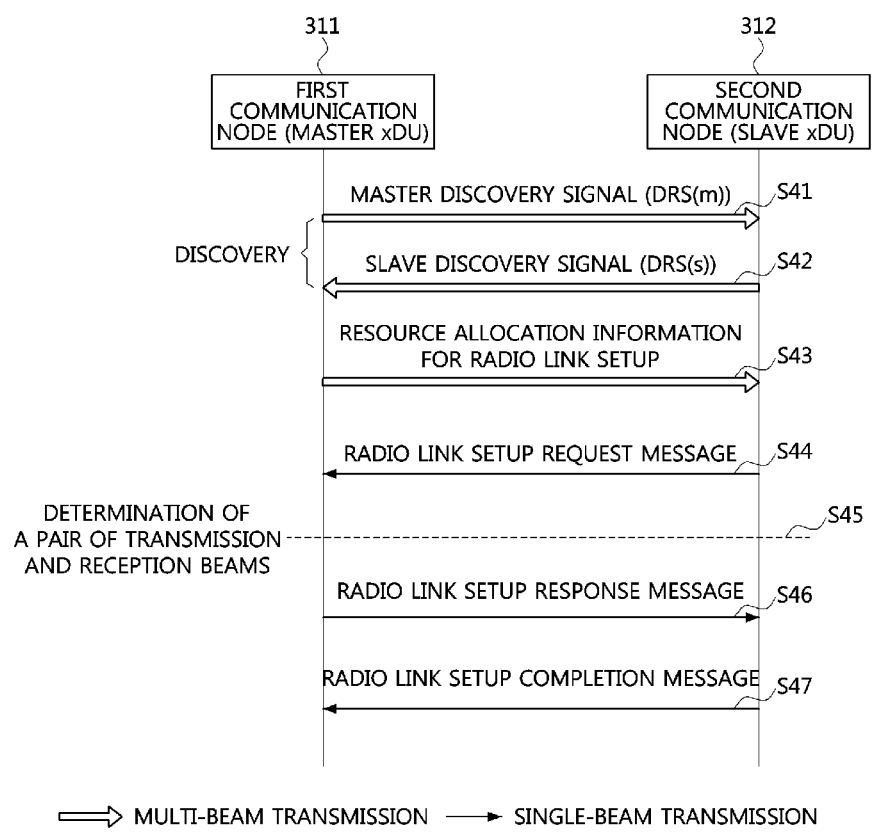
FIG. 12 is a diagram illustrating an example of a method of setting up a radio link between communication nodes.

FIG. 12 is a diagram illustrating an example of a method of setting up a radio link between communication nodes.

Referring to FIG. 12, a first xDU node 311 (i.e., master xDU) may transmits a master discovery signal DRS(m) to a second xDU 312 (i.e., slave xDU) in order to set up a radio link with the second xDU 312 (S41).

Then, the xDU 312 may transmit a slave discovery signal DRS(s) to the first xDU 311 in order to set up a radio link with the first xDU 311 (S42).

Then, the first xDU 311 may transmit resource allocation information (grant information) for radio link setup to the second xDU 312 together with an access response message (S43).

Then, the second xDU 312 may transmit a link setup request message to the first xDU 311 together with an access indication message (S44). Here, the link setup request message may include an identifier of the xDU requesting the radio link setup (e.g., xDU info: XDU ID or random number, etc.) and reason of radio link setup.

Upon completion of the step S44, a pair of transmission and reception beams may be determined between the first xDU 311 and the second xDU 312 (S45).

Then, the first xDU 311 may transmit a radio link setup response message to the second xDU 312 (S46).

Then, the second xDU 312 may transmit a radio link setup completion message to the first xDU 311 (S47).

As described above, the radio link may be set up between the first xDU 311 and the second xDU 312 through the steps S41 to S47.

Figure 13:
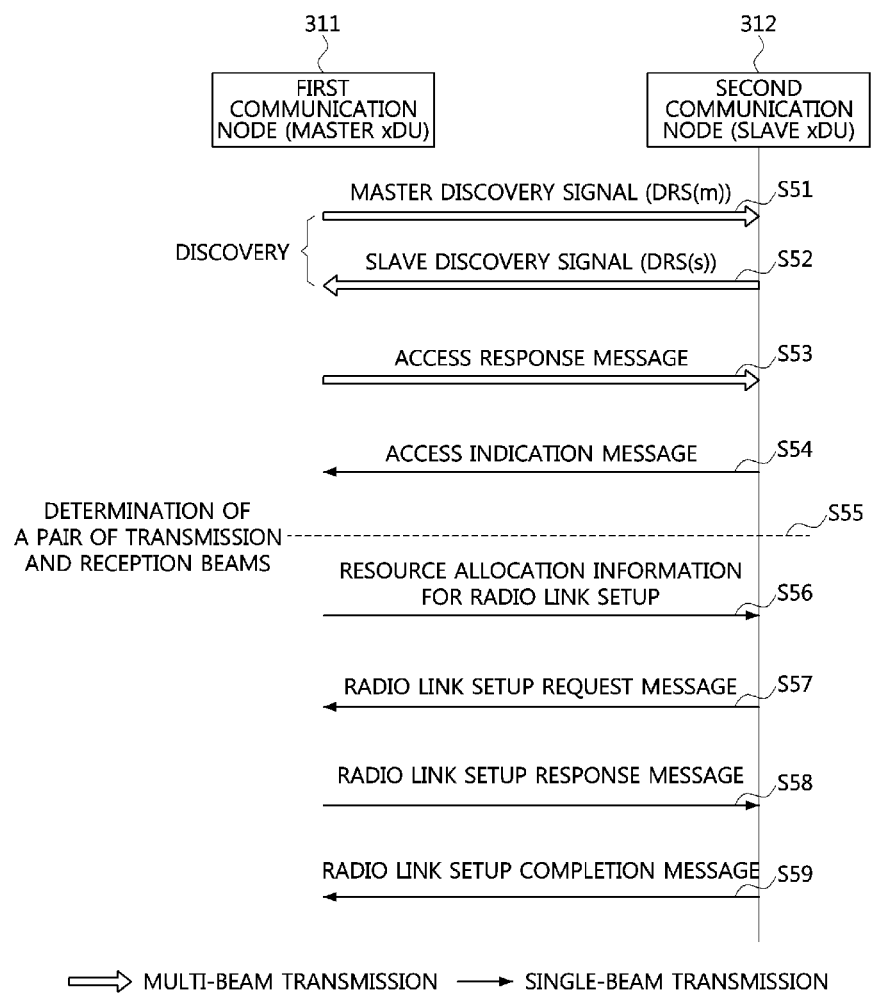
FIG. 13 is a diagram illustrating another example of a method of setting up a radio link between communication nodes.

FIG. 13 is a diagram illustrating another example of a method of setting up a radio link between communication nodes.

Referring to FIG. 13, the first xDU 311 (i.e., master xDU) may transmit a master discovery signal DRS(m) to the second xDU 312 (i.e., slave xDU) in order to set up a radio link with the second xDU 312 (S51).

Then, the second xDU 312 may transmit a slave discovery signal DRS(s) to the first xDU 311 in order to set up a radio link with the first xDU 311 (S52).

Then, the first xDU 311 may transmit an access response message to the second xDU 312 (S53).

Subsequently, the second xDU 312 may transmit an access indication message to the first xDU 311 (S54).

Upon completion of the step S54, a pair of transmission and reception beams may be determined between the first xDU 311 and the second xDU 312 (S55).

Subsequently, the first xDU 311 may transmit resource allocation information (grant information) for radio link setup to the second xDU 312 using the beam determined at the step S55 (S56).

Then, the second xDU 312 may transmit a link setup request message to the first xDU 311 (S57). Here, the radio link setup request message may include an identifier (xDU info: XDU ID or random number, etc.) of the xDU requesting the radio link setup and reason of radio link setup.

Then, the first xDU 311 may transmit a radio link setup response message to the second xDU 312 (S58).

Then, the second xDU 312 may transmit a radio link setup completion message to the first xDU 311 (S59).

As described above, the radio link may be set up between the first xDU 311 and the second xDU 312 through the steps S51 to S59.

Figure 14:
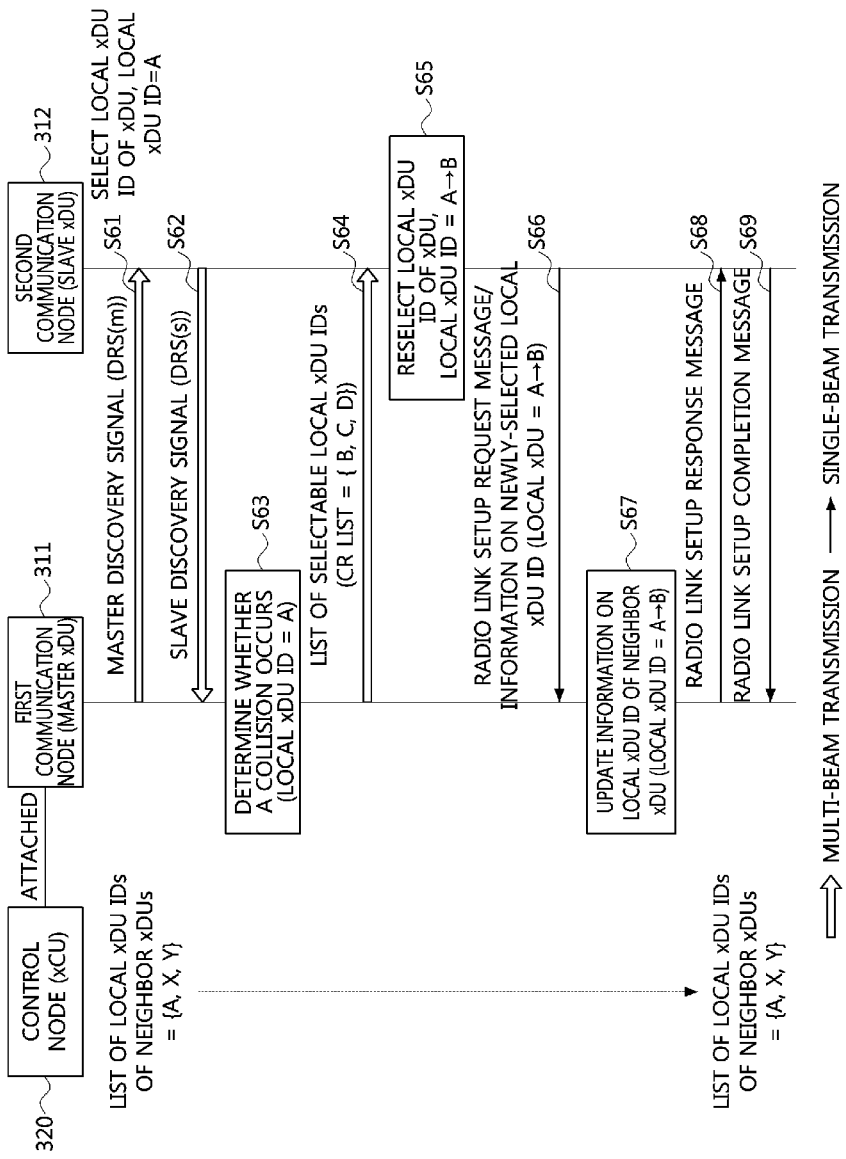
FIG. 14 is a diagram illustrating an example of collision resolution of local IDs between a master xDU and a slave xDU.

FIG. 14 is a diagram illustrating an example of collision resolution of local IDs between a master xDU and a slave xDU.

Referring to FIG. 14, in case that the discovery signal of each of the xDUs 311 and 312 includes a local ID (i.e., local xDU ID) instead of an identifier (xDU ID) of each of the xDUs 311 and 312, collision of the local ID may occur. Since the local ID of each xDU is selected by a separate function part (i.e., xDU control) of each xDU based on measurement performed after each xDU is powered on and newly enters the MXN 300, such the collision may occur. That is, in case that a neighbor xDU using the same local ID is not found at the time of measurement by each xDU, collision of the local ID may occur. The separate function part of each xDU may receive the information through the discovery signals from neighbor xDUs, and compare with managed information of links and neighbors (e.g., list of links and neighbors) to determine whether there is a collision of the local ID.

Hereinafter, a method for the collision resolution of the local IDs between the master xDU and the slave xDU will be described.

The master discovery signal DRS(m) and the slave discovery signal DRS(s) may be transmitted and received between the first xDU 311 and the second xDU 312 which are attempting initial access (S61, S62).

Then, after transmitting and receiving the DRS(m) and the DRS(s), the master sector of the first xDU 311 may determine whether local IDs of neighbor xDUs managed by the first xDU 311 collide with a second local ID of the second xDU 312 (S63).

As a result of the determination in the step S63, in case that the local IDs of the neighbor xDUs managed by the first xDU 311 collide with the second local ID of the second xDU 312, in order to solve the collision of the local IDs, a list of selectable local IDs (CR_list; change request list) for change of the second local ID may be transmitted to the second xDU 312 within the access response message (i.e., A_res message) or a radio link setup response message (S64). That is, the first xDU 311 may generate a list of local IDs which are not used by the neighbor xDUs, and transmit the generated list to the second xDU 312 by including the generated list in the link setup response message. Here, the list of recommended selectable local IDs may be generated by the master sector of the first xDU 311.

The second xDU 312 receiving the list of selectable local IDs from the first xDU 311 may newly reselect a local ID (S65).

Then, the second xDU 312 may transmit information on the newly-selected local ID to the master sector of the first xDU 311 (S66).

Then, the first xDU 311 may update information of the local ID of the second xDU 312 based on the newly-selected local ID received from the second xDU 312 (S67).

Then, the first xDU 311 may transmit a radio link setup response message to the second xDU 312 (S68), and the second xDU 312 may transmit a radio link setup completion message to the first xDU 311 (S69).

FIG. 15 is a diagram illustrating another example of collision resolution of local IDs between a master xDU and a slave xDU.

Referring to FIG. 15, the master discovery signal DRS(m) and the slave discovery signal DRS(s) may be transmitted and received between the first xDU 311 and the second xDU 312 which are attempting initial access (S71, S72).

Then, after transmitting and receiving the DRS(m) and the DRS(s), the master sector of the first xDU 311 may determine whether local IDs used by neighbor xDUs collide with a local ID selected by the second xDU 312 (S73).

Then, the first xDU 311 may transmit an access response (A_res) message to the second xDU 312 in order to set up a radio link with the second xDU 312 (S74), and the second xDU 312 receiving the A_res message from the first xDU 311 may transmit a radio link setup request message to the first xDU 311 (S75).

The first xDU 311, which has received the radio link setup request message from the second xDU 312, may then transmit a link setup response message to the second xDU 312.

As a result of the determination in the step S73, in case that a local ID of any neighbor xDU collides with the local ID of the second xDU 312, in order to solve the collision of the local IDs, a list of selectable local IDs for change of the second local ID may be transmitted to the second xDU 312 within the link setup response message (S76). Here, the list of recommended selectable local IDs may be generated by the master sector of the first xDU 311.

The second xDU 312 receiving the list of selectable local IDs from the first xDU 311 may newly reselect a local ID (S77).

Then, the second xDU 312 may transmit information on the newly-selected local ID to the master sector of the first xDU 311 (S78).

Then, the first xDU 311 may update information of the local ID of the second xDU 312 based on the newly-selected local ID received from the second xDU 312 (S79).

According to the embodiments of the present disclosure, in a wireless communication network, it is possible to perform discoveries between communication nodes supporting directional communications using beamforming, and set up radio links between the communication nodes identified through the discovery procedure.

According to the embodiments of the present disclosure, provided are a method of transmitting radio frames, which supports beam sweeping operations and initial access operations based on beam sweeping, and a communication node therefor. Also, overhead due to the beam sweeping in the initial access operations can be reduced, and performance of beam searching can be enhanced. Also, overhead of guard periods due to transmission and reception mode switching in a frame structure to which the TDD scheme is applied can be reduced.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A radio link setup method performed by a first communication node constituting a wireless communication network, the method comprising:
   transmitting a first master discovery signal including a first sector identifier and a first beam index of the first communication node to a second communication node by using a master sector among a plurality of sectors of the first communication node;
   receiving a first slave discovery signal including a second sector identifier and a second beam index of the second communication node receiving the first master discovery signal;
   in response to the first slave discovery signal, transmitting a feedback message including the second sector identifier and the second beam index to the second communication node; and
   determining a beam for transmission and reception with the second communication node based on the first sector identifier, the first beam index, the second sector identifier, and the second beam index.

2. The radio link setup method according to claim 1, further comprising:
   receiving a radio link setup request message from the second communication node receiving the feedback message; and
   in response to the radio link setup request message, transmitting a radio link setup response message to the second communication node by using the determined beam.

3. The radio link setup method according to claim 1, wherein the first slave discovery signal is received through the master sector.

4. The radio link setup method according to claim 1, wherein the first slave discovery signal is used for an initial access request, and the feedback message is transmitted within an initial access response message for the initial access request.

5. The radio link setup method according to claim 4, further comprising transmitting resource allocation information for setting up a radio link to the second communication node.

6. The radio link setup method according to claim 2, wherein, in the transmitting a radio link setup response message, when slave discovery signals are received from a plurality of sectors of the second communication node, a sector having a highest received signal strength at the first communication node is selected from the plurality of sectors, and the radio link setup response message is transmitted to the selected sector.

7. The radio link setup method according to claim 1, wherein the first master discovery signal includes a first local identifier of the first communication node, and the first slave discovery signal includes a second local identifier of the second communication node.

8. The radio link setup method according to claim 7, further comprising:
   after receiving the first slave discovery signal, determining whether one of local identifiers of neighbor communication nodes managed by the first communication node collides with the second local identifier; and
   in response to determination that one of local identifiers of the neighbor communication nodes collides with the second local identifier, transmitting, to the second communication node, a list of local identifiers which are not used by the neighbor communication nodes.

9. The radio link setup method according to claim 8, further comprising:
   receiving, from the second communication node, a new local identifier selected from the list of local identifiers; and
   updating information on the local identifier of the second communication node based on the new local identifier.

10. The radio link setup method according to claim 1, further comprising:
    receiving a second slave discovery signal from a neighbor communication node through a sector in idle state in which a radio link is not set up with the neighbor communication node; and
    in response to the second slave discovery signal, transmitting, to the neighbor communication node, a feedback message including a sector identifier and a beam index included in the received second slave discovery signal through the sector in idle state.

11. A radio link setup method performed by a second communication node requesting to access a first communication node connected to a wireless communication network, the method comprising:
    transmitting, to the first communication node, a slave discovery signal including a first sector identifier and a first beam index of the second communication node by using a slave sector among a plurality of sectors of the second communication node;

receiving a first feedback message including a second sector identifier and a second beam index of the first communication node from the first communication node receiving the slave discovery signal;

in response to the first feedback message, transmitting a second feedback message including the second sector identifier and the second beam index to the first communication node; and determining a beam for transmission and reception with the first communication node based on the first sector identifier, the first beam index, the second sector identifier, and the second beam index.

12. The radio link setup method according to claim 11, further comprising:

transmitting a radio link setup request message to the first communication node by using the determined beam; and receiving a radio link setup response message from the first communication node receiving the radio link setup request message.

13. The radio link setup method according to claim 11, wherein the first feedback message transmitted by the first communication node includes timing adjustment information for transmission of other messages after the first feedback message.

14. The radio link setup method according to claim 11, wherein the first slave discovery signal is used for an initial access request, and the first feedback message is received as included in an access response message for the initial access request.

15. The radio link setup method according to claim 14, wherein, when the access response message is received from a plurality of sectors of the first communication node, a sector having a highest received signal strength at the second communication node is selected from the plurality of sectors of the first communication node, and an access indication message is transmitted to the selected sector.

* * * * *